United States Patent
Charng

(10) Patent No.: US 6,681,441 B1
(45) Date of Patent: Jan. 27, 2004

(54) STRUCTURAL IMPROVEMENT OF A WINDSHIELD WIPER PRESSURIZATION PLATE

(75) Inventor: Sheng Kao Charng, Taipei (TW)

(73) Assignee: Clearco Product Limited, Wu Ku Hsiang (TW)

( * ) Notice: Subject to any disclaimer, the term of this patent is extended or adjusted under 35 U.S.C. 154(b) by 0 days.

(21) Appl. No.: 10/216,710

(22) Filed: Aug. 13, 2002

(51) Int. Cl.⁷ .............................. B60S 1/04; B60S 1/32; B60S 1/34
(52) U.S. Cl. .............................. 15/257.01; 15/250.201; D12/220
(58) Field of Search .................. 15/257.01, 250.201, 15/250.351, 250.352, 250.001; D12/219, 220

(56) References Cited

U.S. PATENT DOCUMENTS

| | | | | |
|---|---|---|---|---|
| 2,799,887 A | * | 7/1957 | Nemic | 15/250.201 |
| 4,464,808 A | * | 8/1984 | Berry | 15/257.01 |
| 4,782,547 A | * | 11/1988 | Mohnach | 15/250.04 |
| D308,040 S | * | 5/1990 | Colani | D12/220 |
| 4,989,290 A | * | 2/1991 | Hoshino | 15/250.201 |
| 5,276,937 A | * | 1/1994 | Lan | 15/257.01 |
| 6,067,687 A | * | 5/2000 | Shih | 15/250.201 |

FOREIGN PATENT DOCUMENTS

| | | | | |
|---|---|---|---|---|
| FR | 2689835 | * | 10/1993 | 15/250.201 |
| GB | 2220842 | * | 1/1990 | 15/250.201 |

* cited by examiner

*Primary Examiner*—Gary K. Graham
(74) *Attorney, Agent, or Firm*—Leong C. Lei

(57) ABSTRACT

This invention is related to the structural improvement of a windshield wiper pressurization plate. Essentially, the improved plate comprises a strip of material with two arc-shaped ends. There is a raised section on the surface of the strip of material. The raised section contains a shallow slot which, in turn, holds a tapered tunnel. There are a L-shaped hook and a stopper beneath the strip of material. Stairs are installed on the surface opposite and above the L-shaped hook. A semi-circular opening is found on the external side of the bending segment of the L-shaped hook. As a result, the arm of the windshield wiper may be positioned and fixed in between the L-shaped hook and the stopper. The raised section and the tapered tunnel of the pressurization plate are designed to help press the windshield wiper against the windshield.

3 Claims, 6 Drawing Sheets

STRUCTURAL IMPROVEMENT OF A WINDSHIELD WIPER PRESSURIZATION PLATE

BACKGROUND OF THE INVENTION

1. Field of the Invention

This invention is related to the structural improvement of a windshield wiper pressurization plate, and more particularly, a pressurization plate characterized by a good pressurization function and able to prevent the windshield wiper from shaking while brushing the windshield.

2. Description of the Prior Art

Owing to wind pressure, a windshield wiper usually shakes while brushing the windshield of a vehicle running against the wind, imposing a negative effect upon its own rainwater sweeping function. For this reason, some car owners attach a pressurization plate to the arm of a windshield wiper, for pressing, the windshield wiper against the windshield, with a view to preventing the windshield wiper from vibration. FIG. 1 depicts a known pressurization plate 1, which is a planar plate. A plurality of pressurization plate 1 are installed on the arm of a windshield wiper 2. This type of pressurization plate has a limited pressurization effect because of its planar shape. In addition, given the quantitative requirement, it is rather inconvenient to assemble. FIG. 2 depicts another type of pressurization plate 3 which is elongated in an attempt to make improvement. However, for the same reason—a planar shape—the improvement it makes is also limited, failing to prevent the windshield wiper from shaking. More disappointingly, its usage is limited to windshield wiper arms of a certain width.

Therefore, it is an object of the present invention to provide a structural improvement of a windshield wiper pressurization plate which can obviate and mitigate the abovementioned drawbacks.

SUMMARY OF THE INVENTION

The primary object of this creation is to provide a structural improvement of a windshield wiper pressurization plate, so that the windshield wiper shakes less, presses against the windshield better, and sweeps rainwater off the windshield more efficiently.

The aforesaid pressurization plate comprises a strip of material (hereinafter referred to as "the strip") with two arc-shaped ends. There is a raised section on the surface of the strip. The raised section contains a shallow slot which, in turn, holds a tapered tunnel. There are a L-shaped hook hereinafter referred to as "the hook") and a stopper beneath the strip. The arm of the windshield wiper may be positioned and fixed in between the hook and the stopper. The raised section and the tapered tunnel of the pressurization plate are designed to help press the windshield wiper against the windshield.

As regards the aforesaid pressurization plate, wherein the tapered tunnel is designed in such a way that it is positioned behind the top of the raised section of the strip, so that with a downward sweep the windshield wiper sweeps rainwater off the windshield, whereas with a upward sweep the air escapes from the tapered tunnel and thus the windshield wiper does not vibrate.

As regards the aforesaid pressurization plate, there are stairs on the surface opposite and above the hook beneath the strip, for holding windshield wiper arms of different widths and thicknesses.

As regards the aforesaid pressurization plate, wherein the hook beneath the strip has a semi-circular opening on the external side of its bending segment, so that the hook is flexible enough to avoid any bending-induced fractures.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
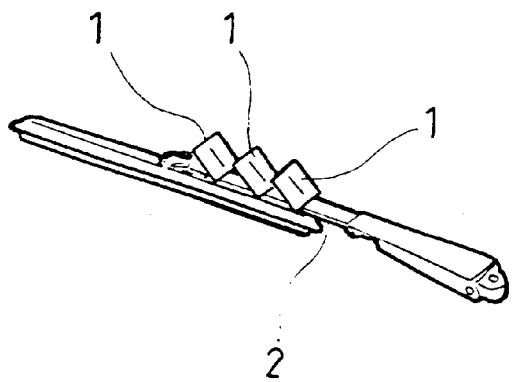
FIG. 1 shows a prior art pressurization plate for a windshield wiper.
Figure 2:
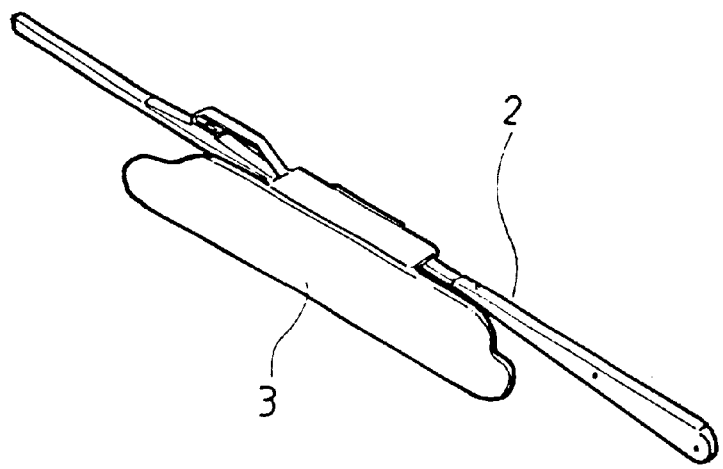
FIG. 2 illustrates another prior art pressurization plate for a windshield wiper.
Figure 3:
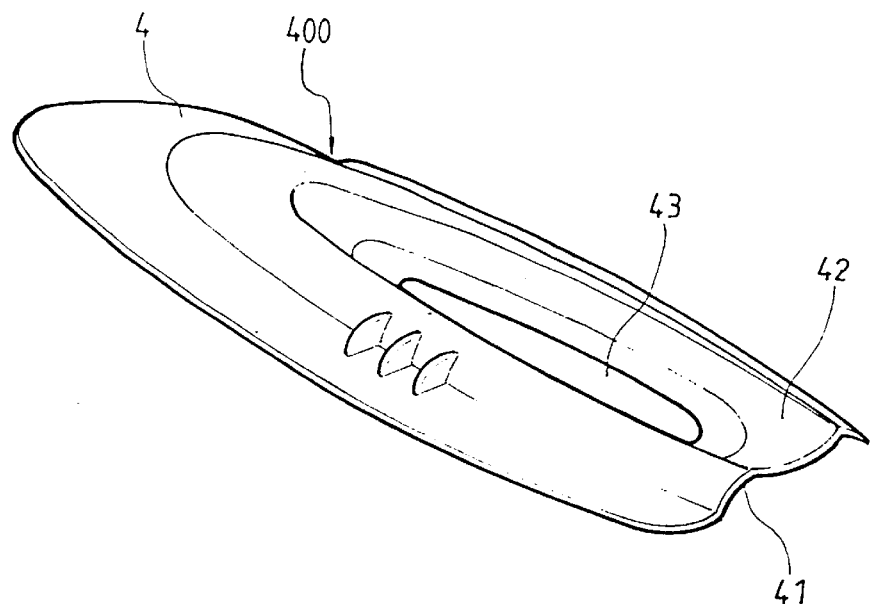
FIG. 3 is a perspective view of the present invention.
Figure 4:
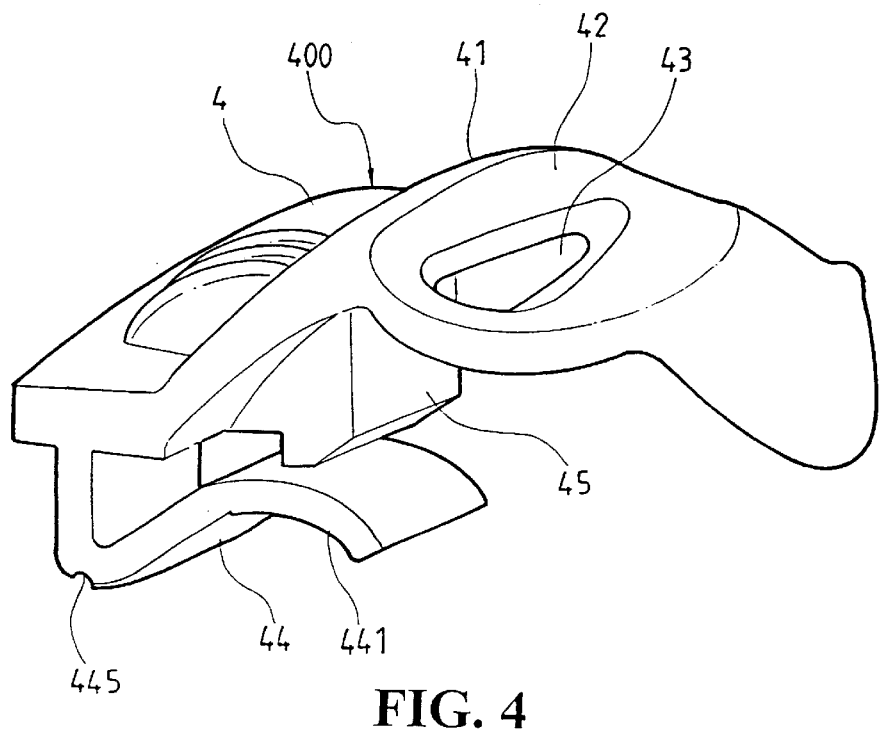
FIG. 4 illustrates another perspective view of the present invention.
Figure 5:
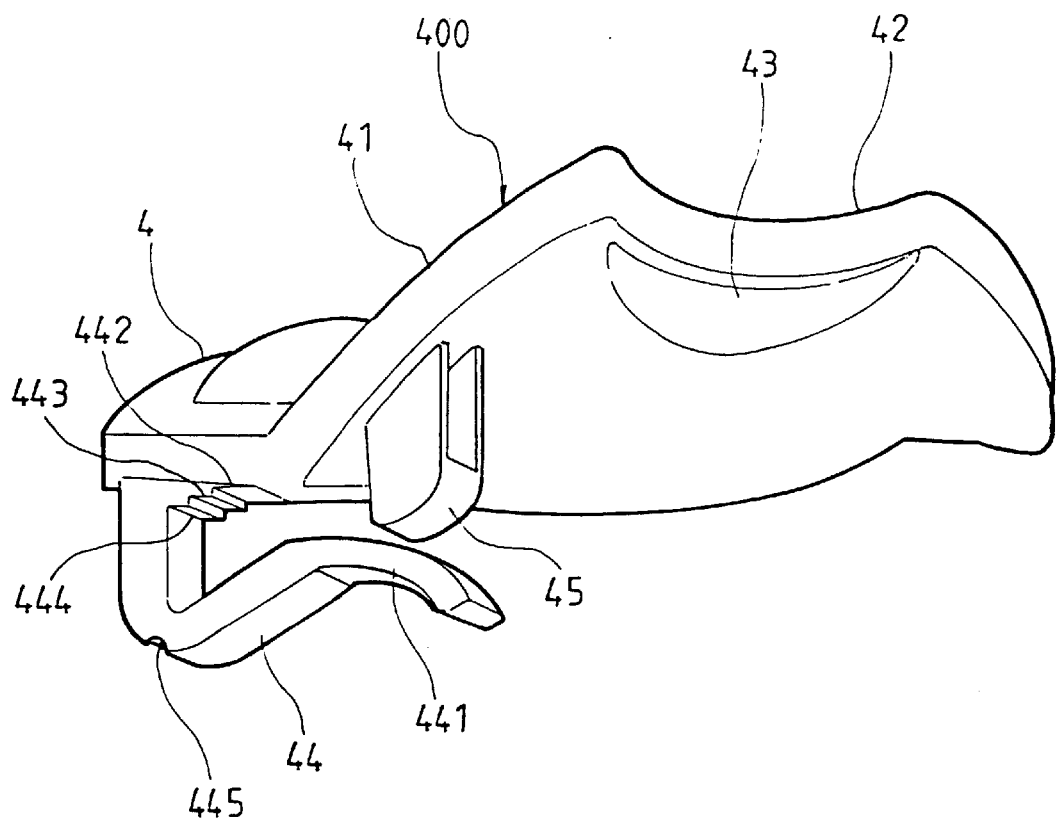
FIG. 5 shows still another perspective view of the present invention.

Please refer to FIGS. 3, 4 & 5. This invention comprises essentially the strip 4 with two sideward arc-shaped ends. The raised section 41 is on the surface of the strip 4. The raised section 41 contains the concave shallow slot 42 which, in turn, holds the tapered tunnel 43. The tapered tunnel 43 is behind the top of the raised section 41.

The L-shaped hook 44 is positioned beneath the anterior part of the strip 4. The horizontal segment 441 of the hook 44 extends upwards and forms an arc segment. The stopper 45, which works with the hook 44, is found between the strip 4 and the hook 44. The stairs 442, 443 & 444 are installed on the surface opposite and above the hook 44. The semi-circular opening 445 is on the external side of the bending segment of the hook 44.

The aforesaid components form the windshield wiper pressurization plate 400, and enable the arm of a windshield wiper to be held firmly in between the hook 44 and the stopper 45. Hence, the windshield wiper pressurization plate 400 is attached to the arm of the windshield wiper, to help press the windshield wiper against the windshield.

Figure 6:
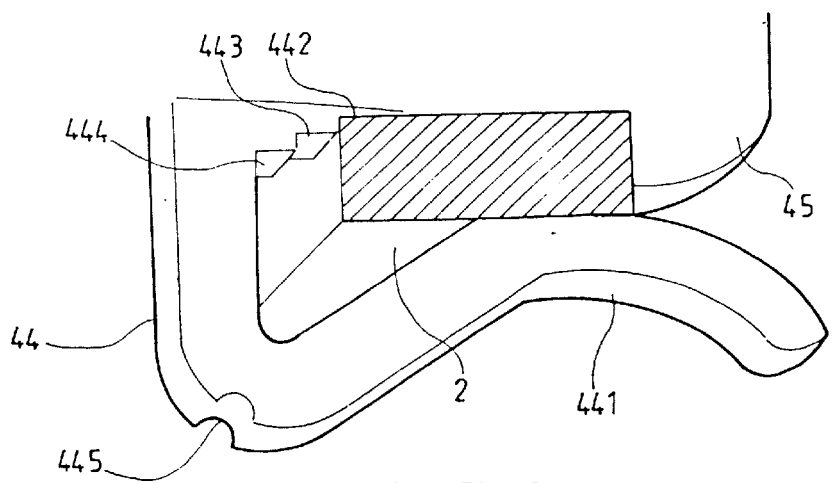
FIGS. 6, 7 and 8 illustrate how to engage the present invention with wiper arms with different widths.
Figure 7:
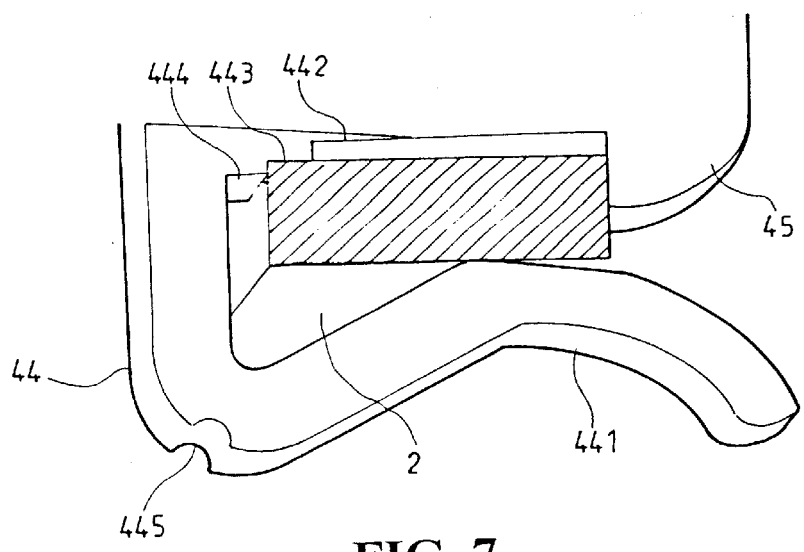
Figure 8:
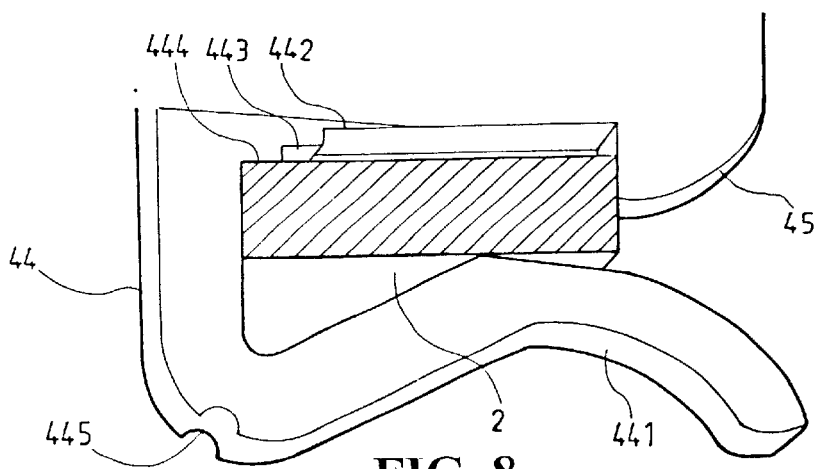

Please refer to FIGS. 6, 7 & 8. This invention enables windshield wiper arms 2 of different widths to be held firmly in between the hook 44 and the stopper 45. This is because the stairs 442, 443 & 444 are installed on the surface opposite and above the hook 44, thus windshield wiper arms 2 of different widths and thicknesses may be held firmly by the stairs 442, 443 & 444 which allow a driver three width options for a windshield wiper. The semi-circular opening 445 on the external side of the bending segment of the hook 44 is designed to prevent the hook 44 from being fractured or deformed, as the hook 44 has to bend in order to hold windshield wiper arms 2 of different widths.

Figure 9:
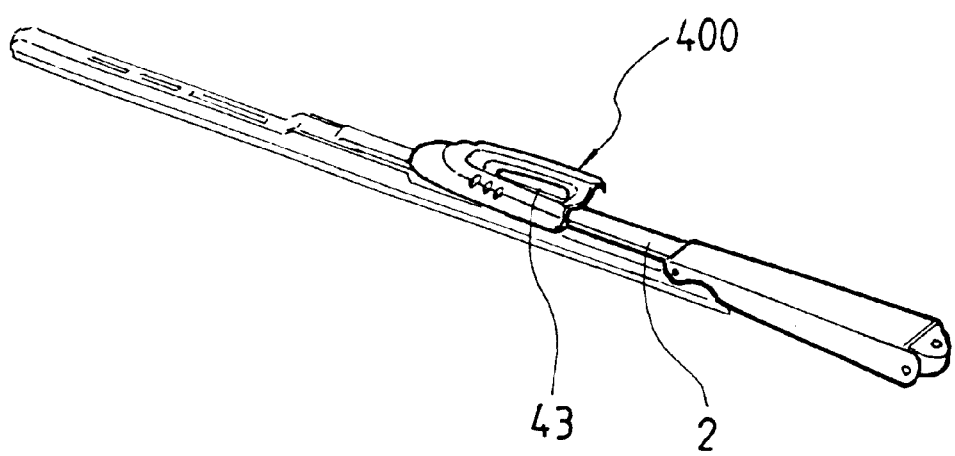
FIGS. 9, 10A and 10B are working views of the present invention.
Figure 10A:
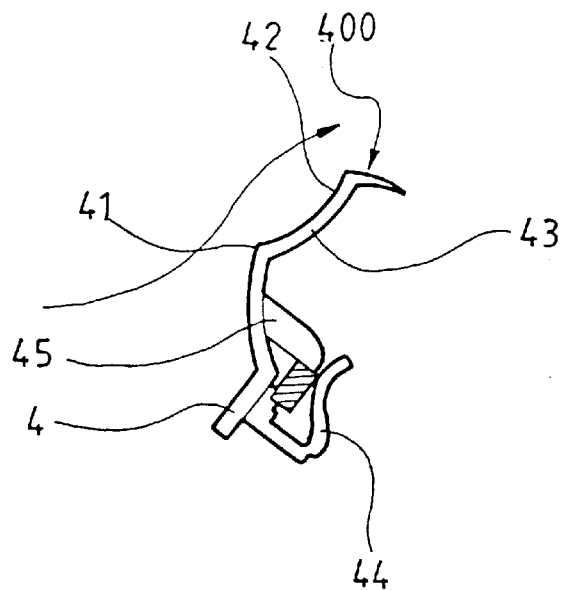
Figure 10B:
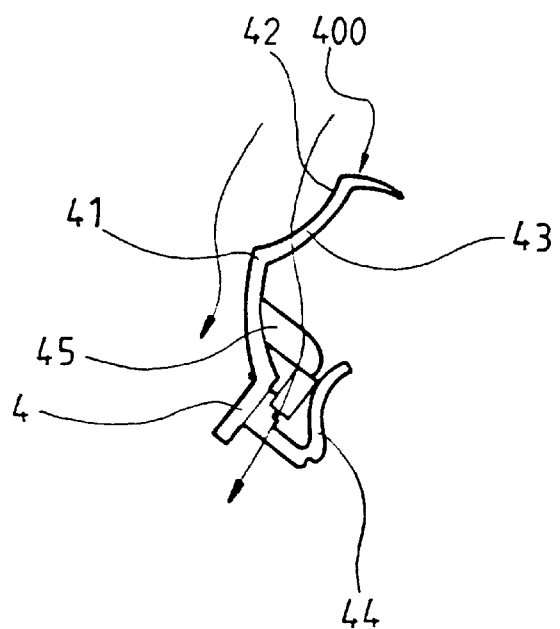

As shown in FIG. 9, once a windshield wiper arm 2 of any width is held by the hook 44 of the pressurization plate 400, the pressurization plate 400 will lie horizontally on the windshield wiper arm 2, moving together with the windshield wiper arm 2. As shown in FIG. 10A, air escapes upward along the raised section 41 of the pressurization plate 400 while the windshield wiper arm 2 is moving downward, sweeping rainwater off the windshield. As shown in FIG. 10B, some air escapes from the tapered tunnel 43 but some air escapes downward along the raised section 41 while the windshield wiper arm 2 is moving upward, preventing the vibration of windshield wiper and wind-lift.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A structurally improved windshield wiper pressurization plate; comprising a strip of material with two sideward arc-shaped ends, a raised section on the surface of the strip of material, the raised section containing a concave shallow slot which, in turn, holds a tapered tunnel, an L-shaped hook beneath an anterior part of the strip of material, and a horizontal segment extending outward to form an arc, a stopper working with the hook and located between the hook and the strip of material, stairs installed on the surface opposite and above the hook to allow a windshield wiper arm of any width to be held in between the hook and the stopper, thereby causing the raised section and the tapered tunnel of the pressurization plate to facilitate the pressing of the windshield wiper against the windshield.

2. The structurally improved windshield wiper pressurization plate of claim 1, wherein the said tapered tunnel installed in the shallow slot is positioned behind the top of the raised section so as to facilitate the flow of air.

3. The structurally improved windshield wiper pressurization plate of claim 1, wherein the said L-shaped hook installed beneath the strip of material has a semi-circular opening on the external side of its horizontal segment so as to make itself flexible enough to avoid fractures or deformation.

* * * * *